United States Patent
Zheng et al.

(10) Patent No.: US 8,446,837 B2
(45) Date of Patent: May 21, 2013

(54) DATA FILTERING METHOD

(75) Inventors: Yong-Ping Zheng, Shanghai (CN); Alex Cheng, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 832 days.

(21) Appl. No.: 12/507,201

(22) Filed: Jul. 22, 2009

(65) Prior Publication Data

US 2010/0023813 A1   Jan. 28, 2010

(30) Foreign Application Priority Data

Jul. 23, 2008   (TW) ................. 97127993 A (51) Int. Cl.
*H04L 12/26* (2006.01)

(52) U.S. Cl.
USPC ........................................ 370/252

(58) Field of Classification Search
None
See application file for complete search history.

(56) References Cited

U.S. PATENT DOCUMENTS 7,965,736 B2 *   6/2011   Ling ...................... 370/465

* cited by examiner

*Primary Examiner* — Ayaz Sheikh
*Assistant Examiner* — Blanche Wong
(74) *Attorney, Agent, or Firm* — Thomas|Horstemeyer, LLP (57) ABSTRACT

A data filtering method for removing invalid data in 3G data stream which is received. The data filtering method includes the following steps. At first, a step (a) of receiving a 3G data stream continually is performed. Then, a step (b) of determining whether the 3G data stream comprises a complete filtering unit is performed. If the 3G data stream comprises a complete filtering unit, a step (c) of determining whether the 3G data stream includes invalid data is performed. If the 3G data stream includes invalid data, a step (d) of marking the invalid data according to a predetermined protocol is performed. Finally, a step (e) of filtering out the marked invalid data is performed.

10 Claims, 6 Drawing Sheets

FIG. 1 (PRIOR ART)

```
0004ee20h: E1 4D 00 00 00 E1 4D 00 00 00 E1 4D 00 00 00 E1 ; 酮...酮...酮...囗
0004ee30h: 4D 00 00 00 E1 4D 00 00 00 E1 4D 00 00 00 E1 4D ; M...酮...酮...酮
0004ee40h: 00 00 00 E1 4D 00 00 00 E1 4D 00 00 00 E1 4D 00 ; ...酮...酮...酮.
0004ee50h: 00 00 E1 4D 00 00 00 E1 4D 00 00 00 E1 4D 00 00 ; ..酮...酮...酮..
0004ee60h: 00 00 00 00 00 00 00 00 00 00 00 00 00 00 00 00 ; ................
0004ee70h: 00 00 00 00 00 00 00 00 00 00 00 00 00 00 00 00 ; ................
0004ee80h: 00 00 00 00 00 00 00 00 00 00 00 00 00 00 00 00 ; ................
0004ee90h: 00 00 00 00 00 00 00 00 00 00 00 00 00 00 00 00 ; ................
0004eea0h: 00 00 00 00 00 00 00 00 00 00 00 00 00 00 00 00 ; ................
0004eeb0h: 00 00 00 00 00 00 00 00 00 00 00 00 00 00 00 00 ; ................
0004eec0h: 00 00 00 00 00 00 00 00 00 00 00 00 00 00 00 00 ; ................
0004eed0h: 00 00 00 00 00 00 00 00 00 00 00 00 00 00 00 00 ; ................
0004eee0h: 00 00 00 00 00 00 00 00 00 00 00 00 00 00 00 00 ; ................
0004eef0h: 00 00 00 00 00 00 00 00 00 00 00 00 00 00 00 00 ; ................
0004ef00h: 00 E1 4D 00 00 00 E1 4D 00 00 00 E1 4D 00 00 00 ; .酮...酮...酮...
0004ef10h: E1 4D 00 00 00 E1 4D 00 00 00 E1 4D 00 00 00 E1 ; 酮...酮...酮...囗
0004ef20h: 4D 00 00 00 E1 4D 00 00 00 E1 4D 00 00 00 E1 4D ; M...酮...酮...酮
0004ef30h: 00 00 00 E1 4D 00 00 00 E1 4D 00 00 00 E1 4D 00 ; ...酮...酮...酮.
0004ef40h: 00 00 E1 4D 00 00 00 E1 4D 00 00 00 E1 4D 00 00 ; ..酮...酮...酮..
0004ef50h: 00 E1 4D 00 00 00 E1 4D 00 00 00 E1 4D 00 00 00 ; .酮...酮...酮...
0004ef60h: E1 4D 00 00 00 E1 4D 00 00 00 E1 4D 00 00 00 E1 ; 酮...酮...酮...囗
0004ef70h: 4D 00 00 00 E1 4D 00 00 00 E1 4D 00 00 00 E1 4D ; M...酮...酮...酮
0004ef80h: 00 00 00 E1 4D 00 00 00 E1 4D 00 00 00 E1 4D 00 ; ...酮...酮...酮.
0004ef90h: 00 00 E1 4D 00 00 00 E1 4D 00 00 00 E1 4D 00 00 ; ..酮...酮...酮..
0004efa0h: 00 00 00 00 00 00 00 00 00 00 00 00 00 00 00 00 ; ................
0004efb0h: 00 00 00 00 00 00 00 00 00 00 00 00 00 00 00 00 ; ................
0004efc0h: 00 00 00 00 00 00 00 00 00 00 00 00 00 00 00 00 ; ................
0004efd0h: 00 00 00 00 00 00 00 00 00 00 00 00 00 00 00 00 ; ................
0004efe0h: 00 00 00 00 00 00 00 00 00 00 00 00 00 00 00 00 ; ................
0004eff0h: 00 00 00 00 00 00 00 00 00 00 00 00 00 00 00 00 ; ................
0004f000h: 00 00 00 00 00 00 00 00 00 00 00 00 00 00 00 00 ; ................
0004f010h: 00 00 00 00 00 00 00 00 00 00 00 00 00 00 00 00 ; ................
0004f020h: 00 00 00 00 00 00 00 00 00 00 00 00 00 00 00 00 ; ................
00041030h: 00 00 00 00 00 00 00 00 00 00 00 00 00 00 00 E1 ; ...............囗
0004f040h: 4D 00 00 00 E1 4D 00 00 00 E1 4D 00 00 00 E1 4D ; M...酮...酮...酮
00041050h: 00 00 00 E1 4D 00 00 00 E1 4D 00 00 00 E1 4D 00 ; ...酮...酮...酮.
```

DATA FILTERING METHOD

CROSS-REFERENCE TO RELATED APPLICATION

This utility application claims priority to Taiwan Application Serial Number 097127993, filed Jul. 23, 2008, which is incorporated herein by reference.

BACKGROUND OF THE INVENTION

1. Field of the invention

This invention relates to a data filtering method, and more particularly, to the data filtering method for filtering a 3G data stream which is received. The data filtering method effectively promotes the ability of processing invalid data of the receiving end of telecommunication, so as to promote the video/audio effects and keep the communication quality higher when the Internet is unstable or the system is running at high load.

2. Description of the Related Art

With the progress of technology, the functions of hardware and software of cell phones have become stronger, so the media functions of the cell phones become more diverse. Nowadays, users can take pictures, listen to music, or watch movies via cell phones. As having been noted, users at two ends in communication could only transmit voices or messages via cell phones in the past. Compared with the delivery of voices, the delivery of images needs larger bandwidth. So, larger network bandwidth is needed to perform video communication smoothly. Until now, the mobile communication network of cell phones has moved forward from 2G era to 3G era, even to 4G era in the future, so the bandwidth of mobile communication network will be much wider and bear the video streams whose requirements of bandwidth are larger. So far, users can acquire the function of video communication through a 3G cell phone. That is to say, the users can see the images and hear the voices of the other side, such as the video conference. Because a common 3G cell phone has a video lens, the dynamic images of users can be captured through the video lens and delivered to the other side via the 3G network, so that the cell phone of the other side can display the dynamic images.

Figure 1:
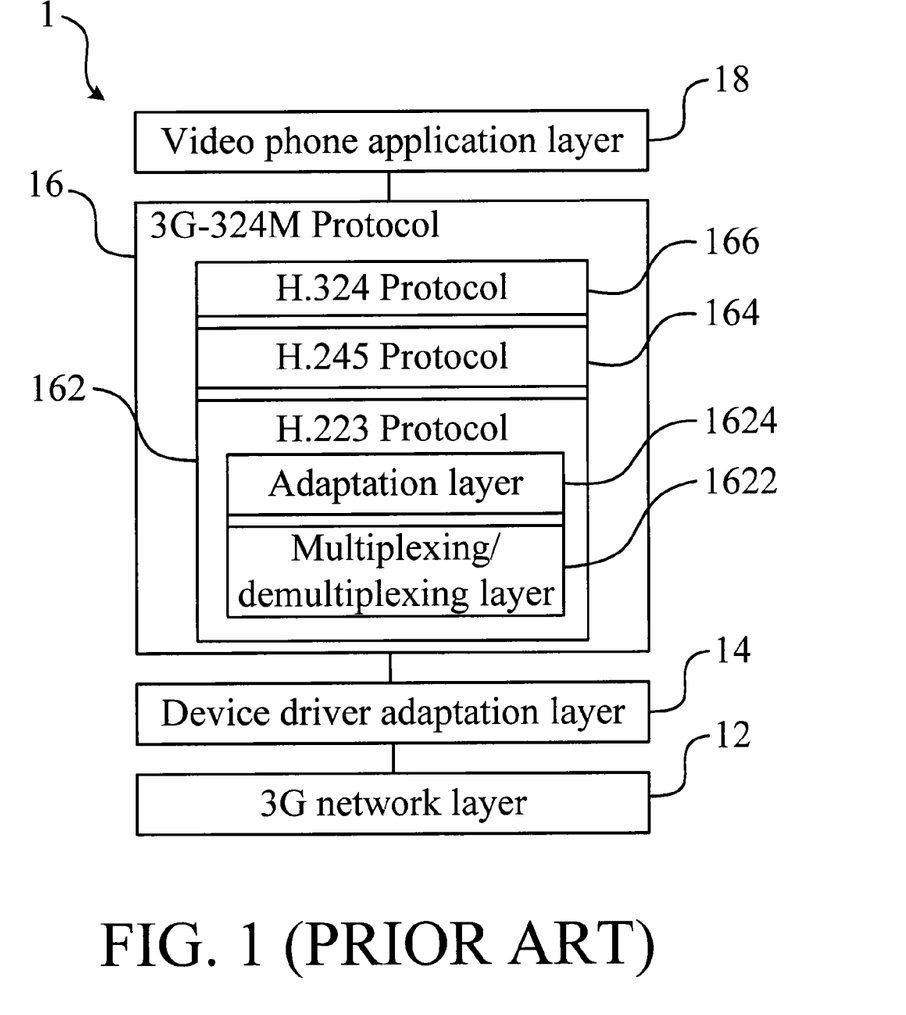
FIG. 1 is an infrastructure diagram illustrating the receiving end of a video phone in the prior art.

The foregoing 3G-324M protocol is a complex protocol, established after collecting many protocols and being revised by an international group: 3rd Generation Partnership Project (3GPP). Besides, it mainly includes many protocols consisting of H.324, H.223, and H.245, and each protocol accomplishes specific functions. Please refer to FIG. 1. FIG. 1 is an infrastructure diagram illustrating the receiving end 1 of a video phone in the prior art. The video phone in the prior art mainly includes a 3G network layer 12, a device driver adaptation layer 14, a 3G-324M protocol 16, and a video phone application layer 18. The 3G-324M protocol 16 mainly includes H.223 protocol 162, H.245 protocol 164, and H.324 protocol 166. Wherein, the H.233 protocol 162 includes a multiplexing/demultiplexing layer 1622 and an adaptation layer 1624. In a word, the functions of the H.223 protocol 162 are multiplexing/demultiplexing and debugging the data in protocol layers. Wherein, the function of multiplexing/demultiplexing is dominated by the multiplex/demultiplex layer 1622, and the adaptation layer 1624 is used to provide the functions such as error code controlling, error code checking, and series numbering mechanism. The function of the H.245 protocol 164 is the processing of control signals.

Before the H.324 protocol of the video phone works, a transmission channel of the bit rate of 64K bit/s will be built in 3G network firstly. Once the transmission is built, the H.324 protocol starts to work. When there is no audio/video signal and control data needs to be transmitted, the H.324 protocol will transmit constant filling codes to the receiving end. In general, the filling codes are all invalid data representing one or more of the number of zero (hereinafter called "zero data"). In other words, when the 3G-234M protocol of the video phone is in the situation of rest, the system will receive the data stream full of zero. Please refer to FIG. 2. FIG. 2 is an image illustrating the bit stream data of a video phone in the prior art. When the 3G-324M protocol of the video phone starts to work, the received data (e.g., video data and audio data) will include the constant data unit defined by the 3G-324M protocol, such as the data unit which begins with "E1 4D 00 00 00" shown in FIG. 2. If the handshaking procedure had been performed, control signals or video, audio and data will be filled among the constant data units in accordance with the 3G-324M protocol. Contrarily, when the 3G-324M protocol of the video phone is in the situation of not receiving control signals, video data or audio signal, the system will fill zero data among constant data units to keep the constant bit rate of 64K bit/s.

Generally, when the receiving end in communication receives bit stream data, the original method is to directly transmit the data stream received by a modem to the 3G-324M protocol to process, to analyze the data stream by the 3G-324M protocol according to its protocol specification, and to feedback the processed result to the application programs. If sending data in constant 64K bit/s data rate under the situations that the network signals are weak or other tasks which consume resources are simultaneously performed while communicating with a mobile phone, the data streams which are shown in FIG. 2 will occur instantly or intermittently. As shown in FIG. 2, it is obvious that there are numerous zero data filled among the bit stream data. Those zero data are filled by the Internet layer for keeping the filling data rate of 64K bit/s. But the fact also proves that the data will make the 3G-324M protocol to analyze and process incorrectly.

However, during the use of a video phone, a user will find that the quality of communication at the receiving end will be effectively affected in the situations when the network signals are not strong enough or other application programs (e.g., some functions which consume the resources of the CPU, such as transmitting-receiving multimedia mails, playing mp3, taking photos, playing games, etc.) are performed simultaneously while proceeding video communication at the receiving end. For example, the situations will generate the phenomenon such as the blocks or mosaic in video images, the noises in audio signals, etc. The situations that error code data are generated are due to the weak network signals. Moreover, the most important reason of the foregoing situations can be discovered by analyzing the retrieved data that the received data are filled numerous invalid data at network terminal. However, the present 3G-324M protocol of the video phone cannot effectively process the invalid data. Namely, if the invalid data are regarded as valid data, the following decoder programs will not efficiently analyze the original video/audio contents.

SUMMARY OF THE INVENTION

A scope of the invention is to provide a data filtering method. The data filtering method according to the invention is particularly used for filtering a 3G data stream which is received. The data filtering method includes the following steps. At first, a step (a) of receiving a 3G data stream continually is performed. Then, a step (b) of determining whether the 3G data stream comprises a complete filtering unit is performed. If the result of the step (b) is negative, the step (a) will be performed again. If the result of the step (b) is positive, a step (c) of determining whether the 3G data stream includes invalid data is performed. Next, if the result of the step (c) is positive, a step (d) of marking the invalid data according to a predetermined protocol is performed. Finally, a step (e) of filtering out the marked invalid data is performed.

Hereby, the data filtering method according to the invention can be used for filtering the 3G data stream which is received. The data filtering method involves a special mechanism filtering out the invalid data representing one or more of the number of zero (i.e., the foregoing zero data) filled in the Internet layer of the 3G-324M protocol layer. In other words, the data filtering method of the invention can solve, by an approach contributing to determining and filtering out invalid data, the problems (e.g., the black blocks or mosaic appearing in video images, the noises in audio signals, etc.) occurring in using a video phone in the past. Accordingly, the data filtering method of the invention can effectively promote the ability of processing the valid data at the receiving end of the telecommunication, so as to promote the audio/video effects and keep a higher communication quality when the Internet is unstable or the system is running at high load.

The advantage and spirit of the invention may be understood by the following recitations together with the appended drawings.

BRIEF DESCRIPTION OF THE APPENDED DRAWINGS

FIG. 2 is an image illustrating the bit stream data of a video phone of the prior art.

DETAILED DESCRIPTION OF THE INVENTION

The purpose of the invention is to provide a data filtering method. And more particularly, the invention involves a filtering mechanism added in the 3G-324M protocol layer. The filtering mechanism is particularly used to filter out the invalid data representing one or more of the number of zero (hereinafter called "zero data") which are filled in the network layer. The preferred embodiments of the invention are described below to illustrate the features and spirits of the invention.

Figure 3:
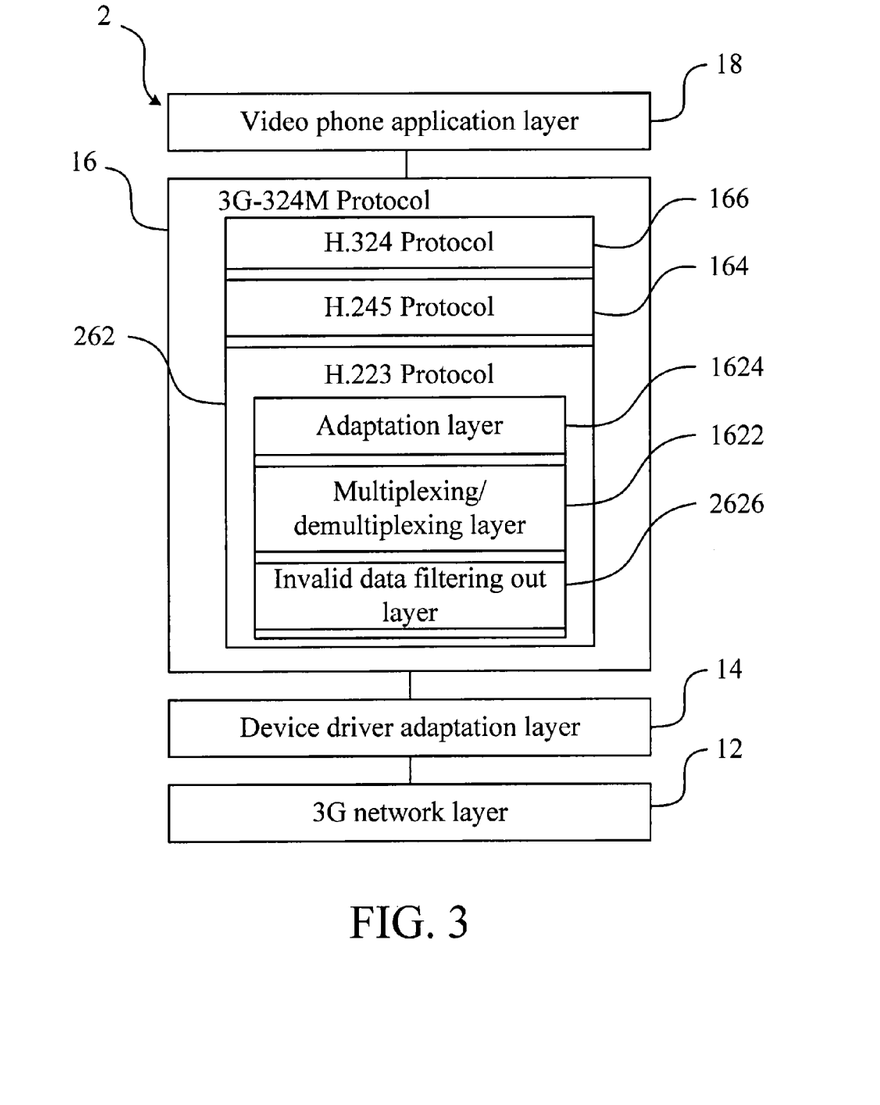
FIG. 3 is an infrastructure diagram illustrating the receiving end of a video phone according to a preferred embodiment of the invention.

Please refer to FIG. 3. FIG. 3 is an infrastructure diagram illustrating the receiving end of a video phone according to a preferred embodiment of the invention. Compared with the infrastructure of the receiving end 1 of the video phone in FIG. 1, it can be clearly understood from FIG. 3 that the infrastructure of the receiving end 2 of the video phone provided by the invention particularly has an invalid data filtering out layer 2626 added before the multiplexing/demultiplexing layer 1622 of the H.223 protocol 262, to support determining and filtering out the invalid data. The detailed mechanism of the invalid data filtering out layer 2626 will be described below.

Figure 4:
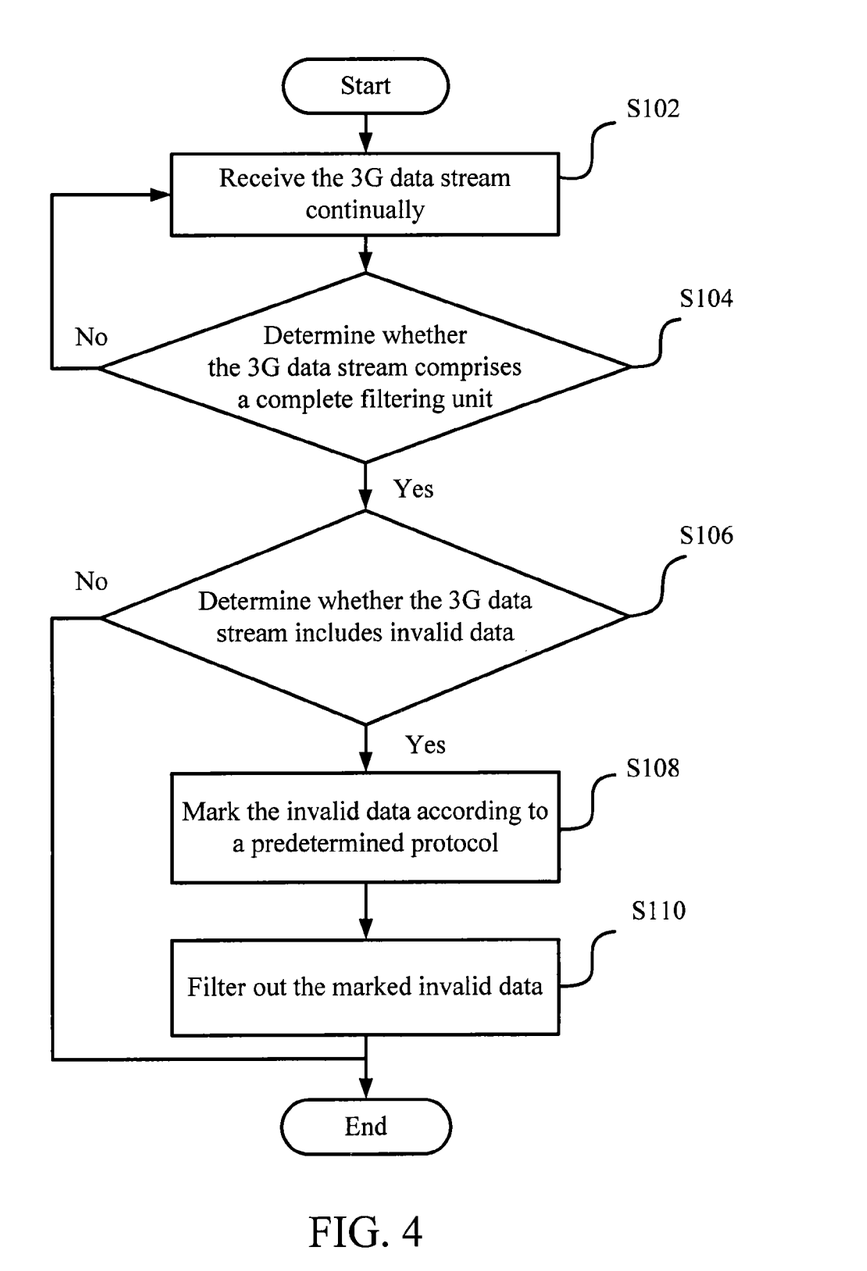
FIG. 4 is a flow chart showing the data filtering method according to a preferred embodiment of the invention.

Please refer to FIG. 4. FIG. 4 is a flow chart showing the data filtering method according to a preferred embodiment of the invention. The data filtering method according to the invention is mainly used for filtering a 3G data stream which is received. The data filtering method of the invention mainly includes the steps below.

As shown in FIG. 4, the data filtering method includes the first step S102: receiving the 3G data stream continually. It should be noted that a 3G data stream or a section of a 3G data stream means for example 3G data continually received, or a group of 3G data received. In general, the step can be achieved by cooperating with a mobile communication device which applies 3G system. For example, the mobile communication device can be a small electronic device with the function of communication, such as a cell phone, a PDA (Personal Digital Assistant), a MID (Mobile Internet Device), an UMPC (Ultra-Mobile PC), etc. It is noted that the foregoing 3G data stream are binary number data. The binary system has base two, and 0 and 1 are the elementary characters. The modem calculators all adopt the binary system because the binary system only uses two digits—0 and 1, which makes it easy to be used and easy to be achieved in electronic form.

Then, the data filtering method according to the invention includes step S104: determining whether the 3G data stream comprises a complete filtering unit. In the embodiment, the foregoing filtering unit includes for example 3G-324M data units. A 3G-324M data unit may include one or more constant filling codes which are filled into the 3G data stream by the 3G-324M protocol. For example, when the compound level is Level 2, a 3G-324M data unit may include constant filling codes such as "E1 4D 00 00 00" or "87 B2 00 00 00", so as to clearly indicate the data following the 3G-324M data unit pertain to 3G-324M protocol.

In more detail, by continually transmitting data in the form of data stream with the 3G-324M protocol e.g., transmitting 160 bytes within an interval of 20 ms, the transmitting rate of the transmitting end can be maintained at the constant 64K bit/s data rate. Because the data is transmitted in the form of data stream by the transmitting end participating in communication, it is unrealistic and feckless to transmit the data by a transmission unit of a data frame as large as for example 600K bits. Therefore, a feasible method is to divide the data frame into M transmission units and then transmit each of the transmission units respectively to the receiving end participating in the communication. Each transmission unit is a foregoing complete filtering unit, and each complete filtering unit includes at least a foregoing 3G-324M data unit. In addition, each transmission unit includes one or more specific marks, such as a mark indicating the rank of the transmission unit arising out of division of the original data frame.

Besides, it is specially noted that after affirming that the received 3G data stream comprises a complete filtering unit, a 3G data stream or a section of the 3G data stream described in the following steps of the invention refers to a complete filtering unit.

As shown in FIG. 4, if the result of step S104 is positive, the data filtering method according to the invention proceeds to step S106: determining whether the 3G data stream includes invalid data. In the embodiment, the foregoing invalid data may comprise an invalid bit stream of zero data. If the result of step S104 is negative, step S102 of the data filtering method according to the invention will be performed again. In other words, the step of receiving the 3G data stream will be continually performed before the received 3G data stream comprises a complete filtering unit. So, when the 3G data stream is confirmed to comprise a complete filtering unit, the step may be stopped.

As shown in FIG. 4, if the result of step S106 is positive, the data filtering method according to the invention proceeds to step S108: marking the invalid data according to a predetermined protocol. In the embodiment, the foregoing predetermined protocol is the 3G-324M protocol and the invalid data are marked by at least a particular mark of the 3G-324M protocol. For example, the particular mark of the 3G-324M protocol may be used to mark a frame size, or a frame division bit, etc. If the result of step S106 is negative, all of the steps in the preferred embodiment may be stopped according to the data filtering method of the invention.

Finally, the data filtering method according to the invention proceeds to step S110: filtering out the marked invalid data. After filtering 3G data stream, all of the steps in the preferred embodiment according to the data filtering method of the invention may be stopped. Certainly, the data filtering method involves a filtering mechanism in a 3G-324M protocol layer. The filtering mechanism particularly filters out the invalid zero data which are filled in the network layer. Normally, the filtered 3G data stream will be processed by following processes of the 3G-324M protocol.

It is noted that the advantage of adopting the 3G-324M protocol is that using 3G-324M protocol for video telephony can provide good video/audio quality while consuming less bandwidth. If the problems such as losing data or data errors occur in the data stream during transmission, the receiving end of the telecommunication can automatically fill the lost data or correct the errors according to the 3G-324M protocol, so as to prevent the delay caused by transmitting the lost data again. However, the 3G-324M protocol is originally designed for the 3G network. So, compared with LAN or DSL (Digital Subscriber Line), the bandwidth of the 3G network is more limited and the fees for data transmission are more expensive. Therefore, before multiplexing the video/audio data to be a media stream, the processor will re-encode the video/audio data according to the video and audio standards of the 3G-324M protocol, in order to decrease the network bandwidth required for communication. If the 3G-324M protocol is used with the data filtering method of the invention, the load of processing the 3G data stream can be greatly decreased after filtering out the invalid zero data which are filled in the network layer, thereby improving the quality of communication.

Figure 5:
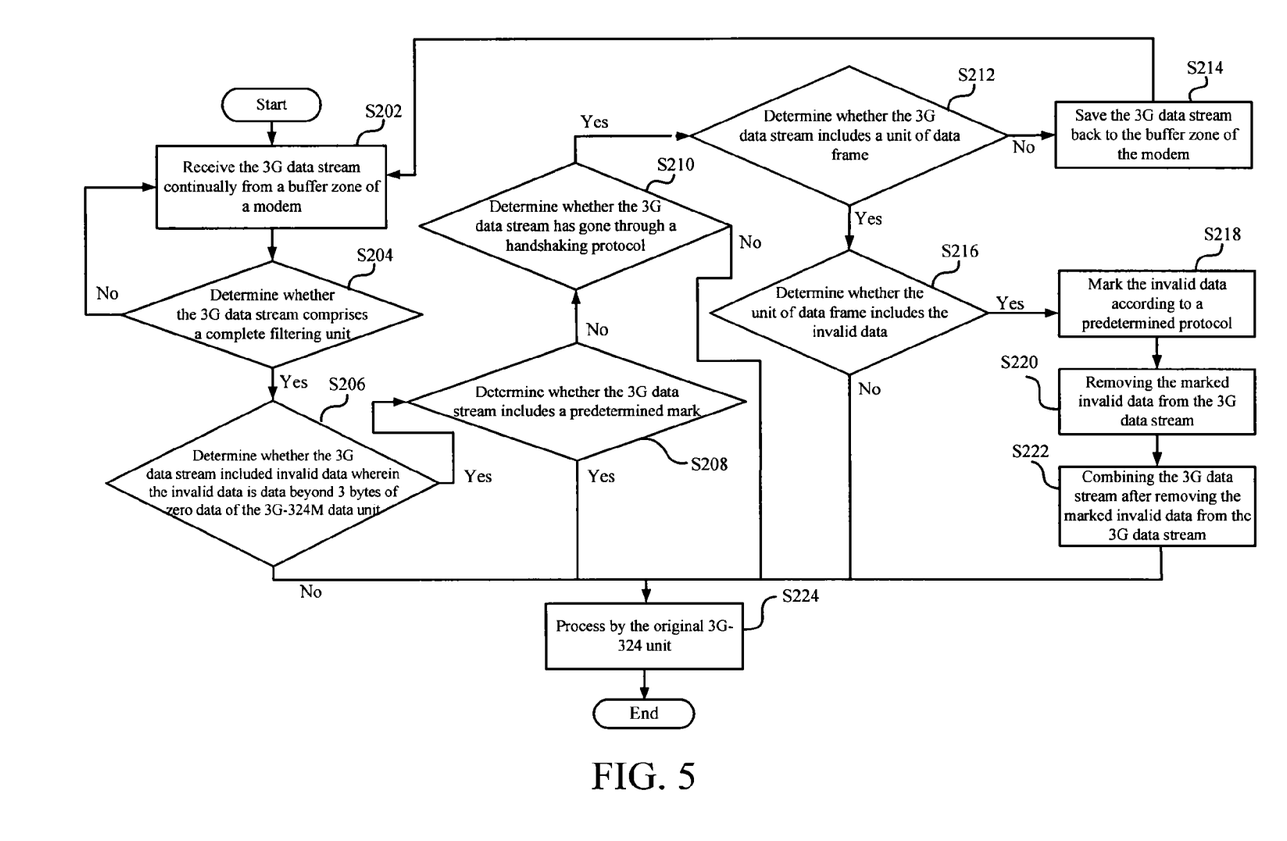
FIG. 5 is a flow chart showing the data filtering method according to another preferred embodiment of the invention.

However, although the effects that the invalid data are filtered out and therefore the video is made clearer can be achieved by performing the foregoing steps in FIG. 4 to all 3G data streams, the approach is not efficient enough. Therefore, please refer to FIG. 5. FIG. 5 is a flow chart showing the data filtering method according to another preferred embodiment of the invention. The data filtering method according to the invention is used for filtering a 3G data stream which is received. And, this preferred embodiment is an example of more efficiently determining 3G data stream(s) in which filtering out the invalid signals is most needed and filtering them out. For more completely embodying this invention, the data filtering method of the invention can include the following steps.

As shown in FIG. 5, the data filtering method according to the invention includes a first step S202: receiving the 3G data stream continually from a buffer zone of a modem. Next, the data filtering method according to the invention proceeds to step S204: determining whether the 3G data stream comprises a complete filtering unit. If the result of step S204 is negative, step S202 of the data filtering method will be performed again. The foregoing two steps S202 and S204 can be understood by reference to the above description of the corresponding steps in FIG. 4, so they will not be described in detail again here. It is noted that in the preferred embodiment, the data filtering method further includes steps below.

As shown in FIG. 5, if the result of step S204 is positive, the data filtering method according to the invention proceeds to step S206: determining whether the 3G data stream includes invalid data which is data beyond 3 bytes or octets of zero data of the 3G-324M data unit. It is noted that the 3G-324M data unit may include "E1 4D 00 00 00" as shown in FIG. 2, wherein the length of the zero data is just 3 bytes. And, all other zero data beyond 3 bytes or octets of zero data of the 3G-324M data unit belong to the invalid data which are uniformly filled into the data stream according to the 3G-324M protocol. Thus, in order to comply with the rules of the 3G-324M protocol, this step S206 can be performed to initially separate the valid data from the invalid data.

If the result of step S206 is negative, the data filtering method according to the invention proceeds to step S224: processing the 3G data stream by the original 3G-324M unit.

As shown in FIG. 5, if the result of step S206 is positive, the data filtering method according to the invention proceeds to step S208: determining whether the 3G data stream includes a predetermined mark. In other words, if the 3G data stream contains invalid data, it should be determined that whether the leading byte or the head of the 3G data unit is the particular mark of the 3G-324M protocol. For example, the particular mark of the 3G-324M protocol may be used to mark a frame size, or a frame division bit, etc.

As shown in FIG. 5, if the result of step S208 is negative, the data filtering method according to the invention proceeds to step S210: determining whether the 3G data stream has undergone a handshaking protocol. It is noted that the matters of image blurring or mosaic generation will be handled during the stage of actual multimedia transmission. It is more meaningful or suitable to determine whether the data are valid data or invalid data only during the stage of actual multimedia transmission. Before actual multimedia transmission, handshaking messages complying with handshaking protocol are used to determine or tell a terminal which codec(s) is supported and the present state). It is fine that there exists invalid data before the stage of actual multimedia transmission. Because if there exists invalid data before the stage, and the receiving terminal finds that the present state or the received messages is not an expected condition, or if the transmitting end of telecommunication receives no feedback messages after it sends data, the transmitting end will re-send the data. Thus, it is more meaningful or suitable to determine whether the filled zero data are valid or invalid after the stage of actual multimedia transmission (i.e. after having gone through the handshaking protocol).

If the result of step S208 is positive, the data filtering method according to the invention proceeds to step S224: processing the 3G data stream by the original 3G-324M unit.

As shown in FIG. 5, if the result of step S210 is positive, the data filtering method according to the invention proceeds to step S212: determining whether the 3G data stream includes a unit of data frame. It is noted that the video/audio data streams will be continually transmitted by the transmitting end of the telecommunication. Accordingly, the receiving end of the telecommunication will continually receive the video/audio data streams. Therefore, the receiving end of the telecommunication does not accept or support that only half of the data frame is displayed on the display module of the receiving end. In other words, the video contents must be shown by the unit of a data frame, and a data frame is shown at a time. Therefore, it is more meaningful or suitable to determine whether there are invalid data in each data frame only after affirming that the received 3G data stream includes a complete data frame.

If the result of step S210 is negative, the data filtering method according to the invention proceeds to step S224: processing the 3G data stream by the original 3G-324M unit.

As shown in FIG. 5, if the result of step S212 is negative, the data filtering method according to the invention proceeds to step S214: saving the 3G data stream back to the buffer zone of the modem. And after step S214 is finished, step S202 of the data filtering method is performed again. That is to say, if the received 3G data stream does not include a complete data frame, it is necessary to receive data stream from the transmitting end of the telecommunication continually through the modem till a complete data frame is received before proceeding to any following steps.

If the result of step S212 is positive, the data filtering method according to the invention proceeds to step S216: determining whether the unit of data frame includes the invalid data.

As shown in FIG. 5, if the result of the step S216 is negative, the data filtering method according to the invention proceeds to step S224: processing the 3G data stream by the original 3G-324M unit.

If the result of step S216 is positive, the data filtering method according to the invention further proceeds to step S218: marking the invalid data according to a predetermined protocol. Next, the data filtering method according to the invention proceeds to step S220: removing the marked invalid data from the 3G data stream. Then, the data filtering method according to the invention proceeds to step S222: combining the 3G data stream after removing the marked invalid data from the 3G data stream. Finally, the data filtering method according to the invention proceeds to step S224: processing the 3G data stream by the original 3G-324M unit. After filtering and combining the 3G data stream, all steps of the data filtering method according to the preferred embodiment of the invention are finished.

Figure 6A:
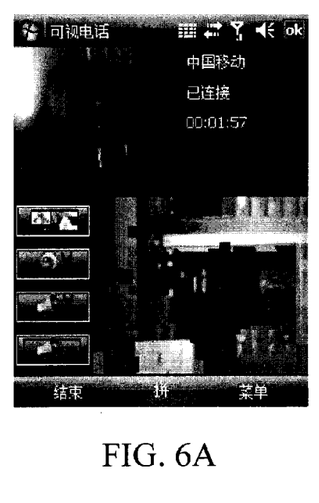
FIG. 6A is a picture illustrating an image displayed on a video phone of the prior art during telephone communication.
Figure 6B:
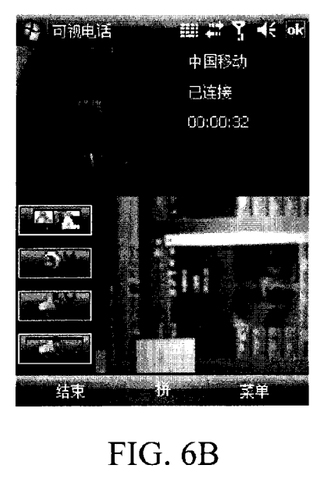
FIG. 6B is a picture illustrating an image displayed on a video phone during telephone communication and which applies the data filtering method according to the invention.

Please refer to FIG. 6A and FIG. 6B. FIG. 6A is a picture illustrating an image displayed on a video phone of the prior art during telephone communication. FIG. 6B is a picture illustrating an image displayed on a video phone during telephone communication and which applies the data filtering method according to the invention. It can be clearly understood from FIG. 6A and FIG. 6B that before filtering out, according to the data filtering method of the invention, the invalid data filled into the 3G data stream, the images derived by the receiving end of the telecommunication will be unclear due to phenomena such as image blurring or mosaic generation; after filtering out, according to the data filtering method of the invention, the invalid data filled into the 3G data stream, the images which are generated by combining the valid data can be clearly displayed on the display module of the receiving end of the telecommunication.

With the foregoing detailed description of the preferred embodiments of the invention, it is clear that the data filtering method of the invention can be used to filter a 3G data stream which is received. The data filtering method involves a special mechanism for filtering out the invalid zero data which are filled into the Internet layer of the 3G-324M protocol. In other words, the data filtering method of the invention can solve, by an approach contributing to determining and filtering out invalid data, problems (e.g. the black blocks or mosaic appearing in video images, the noises in audio signals, etc.) occurring in using a video phone in the past. Accordingly, the data filtering method of the invention can effectively promote the ability of processing the valid data at the receiving end of the telecommunication, so as to promote the audio/video effects and keep a higher communication quality when the Internet is unstable or the system is running at high load.

With the example and explanations above, the features and spirits of the invention have been hopefully well described. Those skilled in the art will readily observe that numerous modifications and alterations of the device may be made while still retaining the teachings of the invention. Accordingly, the above disclosure should be construed as being limited only by the metes and bounds of the appended claims.

What is claimed is:

1. A data filtering method for removing invalid data in a 3G data stream, the data filtering method comprising the steps of:
   (a) receiving the 3G data stream continually from a modem;
   (b) determining whether the 3G data stream includes at least one transmission unit, the at least one transmission unit corresponding to at least one 3G-324M data unit, wherein if it is determined that the 3G data stream includes at least one 3G-324M data unit wherein each of the at least one 3G-324 data unit includes a plurality of bytes, proceed to step (c), otherwise, return to step (a);
   (c) determining whether the 3G data stream includes invalid data wherein the invalid data corresponds to data appearing beyond three bytes each byte having a value of zero in the at least one 3G-324M data unit;
   (d) marking the invalid data according to a predetermined protocol; and
   (e) removing the marked invalid data from the 3G data stream.

2. The data filtering method of claim 1, wherein the 3G data stream corresponds to a binary system data stream.

3. The data filtering method of claim 1, wherein if it is determined that the 3G data stream includes invalid data, step (c) further comprises the step of:
   (c2) determining whether the 3G data stream includes a predetermined mark.

4. The data filtering method of claim 3, wherein the predetermined mark is a 3G-324M leading mark.

5. The data filtering method of claim 3, wherein if it is determined that the 3G data stream does not include a predetermined mark, step (c) further comprises the step of:
   (c3) determining whether the 3G data stream has gone through a handshaking protocol.

6. The data filtering method of claim 5, wherein if it is determined that the 3G data stream has gone through a handshaking protocol, step (c) further comprises the step of:
   (c4) determining whether the 3G data stream includes a complete data frame.

7. The data filtering method of claim 6, wherein if it is determined that the 3G data stream does not include a complete data frame, step (c) further comprises the step of:
   (c5) saving the 3G data stream to a buffer in the modem.

8. The data filtering method of claim 7, wherein if it is determined that the 3G data stream includes a complete data frame, step (c) further comprises the step of:
   (c6) determining whether the complete data frame comprises the invalid data.

9. The data filtering method of claim 1, wherein step (e) further comprises the step of:
   (f) combining remaining data after removing the marked invalid data from the 3G data stream to produce a filtered 3G data stream.

10. The data filtering method of claim 1, wherein the invalid data includes additional bytes having a value of zero beyond the three bytes having a value of zero in the at least one 3G-324M data unit.

* * * * *